(12) United States Patent
Furuya

(10) Patent No.: US 12,031,472 B2
(45) Date of Patent: Jul. 9, 2024

(54) COOLING WATER TEMPERATURE CONTROL DEVICE

(71) Applicant: NIPPON THERMOSTAT CO., LTD., Kiyose (JP)

(72) Inventor: Takatoshi Furuya, Kiyose (JP)

(73) Assignee: NIPPON THERMOSTAT CO., LTD., Kiyose (JP)

(*) Notice: Subject to any disclaimer, the term of this patent is extended or adjusted under 35 U.S.C. 154(b) by 105 days.

(21) Appl. No.: 17/798,482

(22) PCT Filed: Dec. 23, 2020

(86) PCT No.: PCT/JP2020/048087
§ 371 (c)(1),
(2) Date: Aug. 9, 2022

(87) PCT Pub. No.: WO2021/161666
PCT Pub. Date: Aug. 19, 2021

(65) Prior Publication Data
US 2023/0075049 A1 Mar. 9, 2023

(30) Foreign Application Priority Data
Feb. 12, 2020 (JP) ................. 2020-021553

(51) Int. Cl.
*F01P 7/16* (2006.01)
*F01P 7/14* (2006.01)
(Continued)

(52) U.S. Cl.
CPC .............. *F01P 7/16* (2013.01); *F16K 1/44* (2013.01); *F16K 31/06* (2013.01);
(Continued)

(58) Field of Classification Search
CPC .... F01P 7/16; F01P 2007/146; F01P 2025/08; F01P 3/02; F01P 2060/045;
(Continued)

(56) References Cited

U.S. PATENT DOCUMENTS

| 4,964,371 A | 10/1990 | Maeda et al. |
| 6,053,417 A * | 4/2000 | Hotta ............... F25B 41/325 236/92 B |
| 8,967,091 B2 | 3/2015 | Bellinger et al. |

FOREIGN PATENT DOCUMENTS

EP 3382176 A1 10/2018
JP H10317967 A * 12/1998 ........ F01P 2007/146
(Continued)

OTHER PUBLICATIONS

Machine Translation of JPH10317967A PDF File Name: "JPH10317967A_Machine_Translation.pdf".*
(Continued)

*Primary Examiner* — Grant Moubry
*Assistant Examiner* — Ruben Picon-Feliciano
(74) *Attorney, Agent, or Firm* — WHDA, LLP

(57) ABSTRACT

The cooling water temperature control device includes a thermo valve 2 that opens a main flow passage R1 when the temperature of a sensed region R1*a* in the main flow passage R1 reaches or exceeds an operating temperature set in advance, a sub-valve 3 that opens and closes a sub-flow passage R2 bypassing the thermo valve 2, and a control unit 6 that opens the sub-valve 3 when the temperature of the cooling water on an upstream side of the thermo valve 2 is a predetermined temperature. One end on the upstream side of the sub-flow passage R2 is connected to the sensed region R1*a* in the main flow passage R1 or to a downstream side of
(Continued)

the sensed region R1a, and the operating temperature of the thermo valve 2 is set to be equal to or lower than the predetermined temperature.

7 Claims, 5 Drawing Sheets

(51) Int. Cl.
  *F16K 1/44* (2006.01)
  *F16K 31/06* (2006.01)
  *G05D 23/19* (2006.01)
(52) U.S. Cl.
  CPC .... *G05D 23/1925* (2013.01); *F01P 2007/146* (2013.01); *F01P 2025/08* (2013.01)
(58) Field of Classification Search
  CPC ..... F01P 2060/08; F01P 2060/16; F16K 1/44; F16K 31/06; F16K 31/002; F16K 31/0648; F16K 37/005; G05D 23/1925
  See application file for complete search history.

(56) References Cited

FOREIGN PATENT DOCUMENTS

| | | |
|---|---|---|
| JP | H10317967 A | 12/1998 |
| JP | 2005-98153 A | 4/2005 |
| JP | 2007-120380 A | 5/2007 |

OTHER PUBLICATIONS

International Search Report dated Mar. 23, 2021, issued in counterpart International Application No. PCT/JP2020/048087. (2 pages).
Extended (Supplementary) European Search Report dated Feb. 27, 2024, issued in counterpart application No. 20918912.5. (14 pages).

\* cited by examiner

COOLING WATER TEMPERATURE CONTROL DEVICE

TECHNICAL FIELD

The present invention relates to a cooling water temperature control device.

BACKGROUND ART

Cooling water heated by an internal combustion engine may be distributed to various devices such as a heater core, an automatic transmission fluid (ATF) warmer, an exhaust gas recirculation (EGR), or a throttle body. In such a case, for the purpose of controlling the temperature of the cooling water supplied to each device, a thermo valve may be provided in the middle of a passage leading to each device (for example, Patent Literature 1). The thermo valve includes a temperature sensing unit incorporating wax that senses the temperature, is disposed in a flow passage through which the cooling water flows, and senses the temperature of the cooling water of a sensed region located around the temperature sensing unit in the flow passage. Further, the thermo valve is set to open or close when the temperature of the cooling water in the sensing section reaches or exceeds the preset operating temperature.

CITATION LIST

Patent Literature

PTL 1: JP 2007-120380 A

SUMMARY OF INVENTION

Technical Problem

In the case where the thermo valve is closed and the cooling water of the sensing section whose temperature is sensed (the temperature sensing) by the thermo valve is not flowing (the cooling water is retained), even when the temperature of the cooling water on the upstream side of the thermo valve reaches or exceeds the operating temperature of the thermo valve, the cooling water with an increased temperature does not reach the sensed region. Accordingly, in such a state, the temperature sensing unit cannot sense a temperature change in the cooling water. Therefore, in a conventional cooling water temperature control device including the thermo valve, the cooling water slightly leaks even when the thermo valve is closed (JP 2007-120380 A, paragraph [0028]), which prevents the cooling water from retaining in the sensed region, and the temperature sensing unit can sense the temperature of the cooling water.

However, in the conventional cooling water temperature control device, even when the thermo valve is closed, the cooling water that causes the thermo valve to sense the temperature constantly leaks from the thermo valve, resulting in that the cooling water is wasted and heat of the cooling water cannot be effectively used. Further, in the conventional cooling water temperature control device, the operating temperature of the thermo valve is predetermined by a preparation of the wax incorporated in the temperature sensing unit. In order to adjust the temperature at which the thermo valve opens, there is no choice but to replace with the thermo valve set at a different operating temperature, which means that it is difficult to adjust the temperature at which the thermo valve opens.

The object of the present invention is to provide a cooling water temperature control device capable of reducing waste of the cooling water, effectively using the heat of the cooling water that has been conventionally wasted, and easily adjusting the temperature at which the thermo valve opens.

Solution to Problem

A cooling water temperature control device according to the present invention that solves the above problems includes a main flow passage through which cooling water flows, a thermo valve that is disposed in the main flow passage and opens and closes the main flow passage, a sub-flow passage that bypasses the thermo valve, a sub-valve that opens and closes the sub-flow passage, and a control unit that opens the sub-valve when the temperature of the cooling water on the upstream side of the thermo valve reaches a predetermined temperature. The thermo valve includes a temperature sensing unit that senses the temperature of a sensed region in the main flow passage, and opens the main flow passage when the temperature of the sensed region reaches or exceeds the operating temperature set in advance. One end on the upstream side of the sub-flow passage is connected to the sensed region or a downstream side of the sensed region in the main flow passage, and the operating temperature is set to be equal to or lower than the predetermined temperature.

According to the above configuration, in a state where both the thermo valve and the sub-valve are closed, the cooling water of the sensed region is retained, and even when the temperature of the cooling water on the upstream side of the thermo valve rises above the operating temperature, the cooling water with the increased temperature does not reach the sensed region. However, in the case where the sub-valve is opened by the control unit, a flow of the cooling water is generated in the sensed region. Accordingly, when the temperature of the cooling water on the upstream side of the thermo valve increases, the cooling water with the increased temperature reaches the sensed region, so that the thermo valve can sense the temperature. Thus, the sub-valve may be opened at the timing when the temperature is desired to be sensed by the thermo valve, and the thermo valve is completely closed at other times. In other words, according to the above configuration, it is not necessary to constantly leak the cooling water for the temperature sensing in the state where the thermo valve is closed as in the conventional case, and the sub-valve may be opened only when necessary (when the temperature sensing is desired). As a result, the waste of the cooling water can be reduced, and the heat of the cooling water that has been conventionally wasted can be effectively utilized.

Further, according to the above configuration, the operating temperature at which the thermo valve is opened is equal to or lower than the predetermined temperature at which the sub-valve is opened. Accordingly, when the sub-valve is opened to enable the thermo valve to sense the temperature, the thermo valve is opened. As a result, the predetermined temperature at which the sub-valve is opened becomes a temperature at which the thermo valve is opened, and by changing the predetermined temperature at which the sub-valve is opened, the temperature at which the thermo valve is opened can be changed without changing the operating temperature of the thermo valve, and thus the temperature at which the thermo valve is opened can be easily adjusted.

In addition, the cooling water temperature control device may include a plurality of valve units each having a thermo valve and a sub-valve, the predetermined temperature that opens the sub-valve may be set for each valve unit, and the operating temperature of the thermo valves in all the valve units may be set to the minimum temperature or less among the predetermined temperatures. In this way, even in the case where the operating temperatures of the thermo valves constituting the valve units are the same, when the predetermined temperature that opens the sub-valve of each valve unit is individually set, each thermo valve can be opened at the individually set predetermined temperature.

Another cooling water temperature control device according to the present invention made to solve the above problems includes a main flow passage through which the cooling water flows, a thermo valve that is disposed in the main flow passage and opens and closes the main flow passage, a sub-flow passage that bypasses the thermo valve, a sub-valve that opens and closes the sub-flow passage, and a control unit that opens the sub-valve when the temperature of the cooling water on the upstream side of the thermo valve becomes lower than an predetermined temperature. The thermo valve includes a temperature sensing unit that senses the temperature of a sensed region in the main flow passage, and closes the main flow passage when the temperature of the sensed region reaches or exceeds the operating temperature set in advance. One end on the upstream side of the sub-flow passage is connected to the sensed region or the downstream side of the sensed region in the main flow passage, and the operating temperature is set to be higher than the predetermined temperature.

According to the above configuration, in a state where both the thermo valve and the sub-valve are closed, the cooling water of the sensed region is retained. Even when the temperature of the cooling water on the upstream side of the thermo valve is lower than the operating temperature, the cooling water with a decreased temperature does not reach the sensed region. However, once the sub-valve is opened by the control unit, a flow of the cooling water is generated in the sensed region, and thus when the temperature of the cooling water on the upstream side of the thermo valve decreases, the cooling water with the decreased temperature reaches the sensed region, so that the thermo valve can sense the temperature. Accordingly, the sub-valve may be opened at the timing when the temperature is desired to be sensed by the thermo valve, and it is not necessary to constantly leak the cooling water for the temperature sensing as in the conventional case. In other words, according to the above configuration, it is not necessary to constantly leak the cooling water for the temperature sensing in the state where the thermo valve is closed as in the conventional case, and the sub-valve may be opened only when necessary (when the temperature sensing is desired). As a result, the waste of the cooling water can be reduced, and the heat of the cooling water that has been conventionally wasted can be effectively utilized.

Further, according to the above configuration, the operating temperature at which the thermo valve is closed is higher than the predetermined temperature at which the sub-valve is opened. The thermo valve is configured to open when the temperature of the cooling water of the sensed region falls below the operating temperature, and the predetermined temperature is a temperature lower than the operating temperature. As a result, by changing the predetermined temperature at which the sub-valve is opened, the temperature at which the thermo valve is opened can be changed without changing the operating temperature of the thermo valve, and thus the temperature at which the thermo valve is opened can be easily adjusted according to the above configuration.

In each of the cooling water temperature control devices described above, when the thermo valve is open, the control unit may close the sub-valve arranged in the sub-flow passage bypassing the thermo valve, and in this way, power can be saved when the sub-valve is a normally closed electromagnetic valve. Alternatively, the sub-valve may be an electromagnetic valve, and in this way, an electric control of the sub-valve is possible and an opening and closing control of the sub-valve can be easily performed.

Advantageous Effects of Invention

According to the cooling water temperature control device of the present invention, the waste of the cooling water can be reduced, the heat of the cooling water that has been conventionally wasted can be effectively used, and the temperature at which the thermo valve is opened can be easily adjusted.

DESCRIPTION OF EMBODIMENTS

First Embodiment

Figure 1:
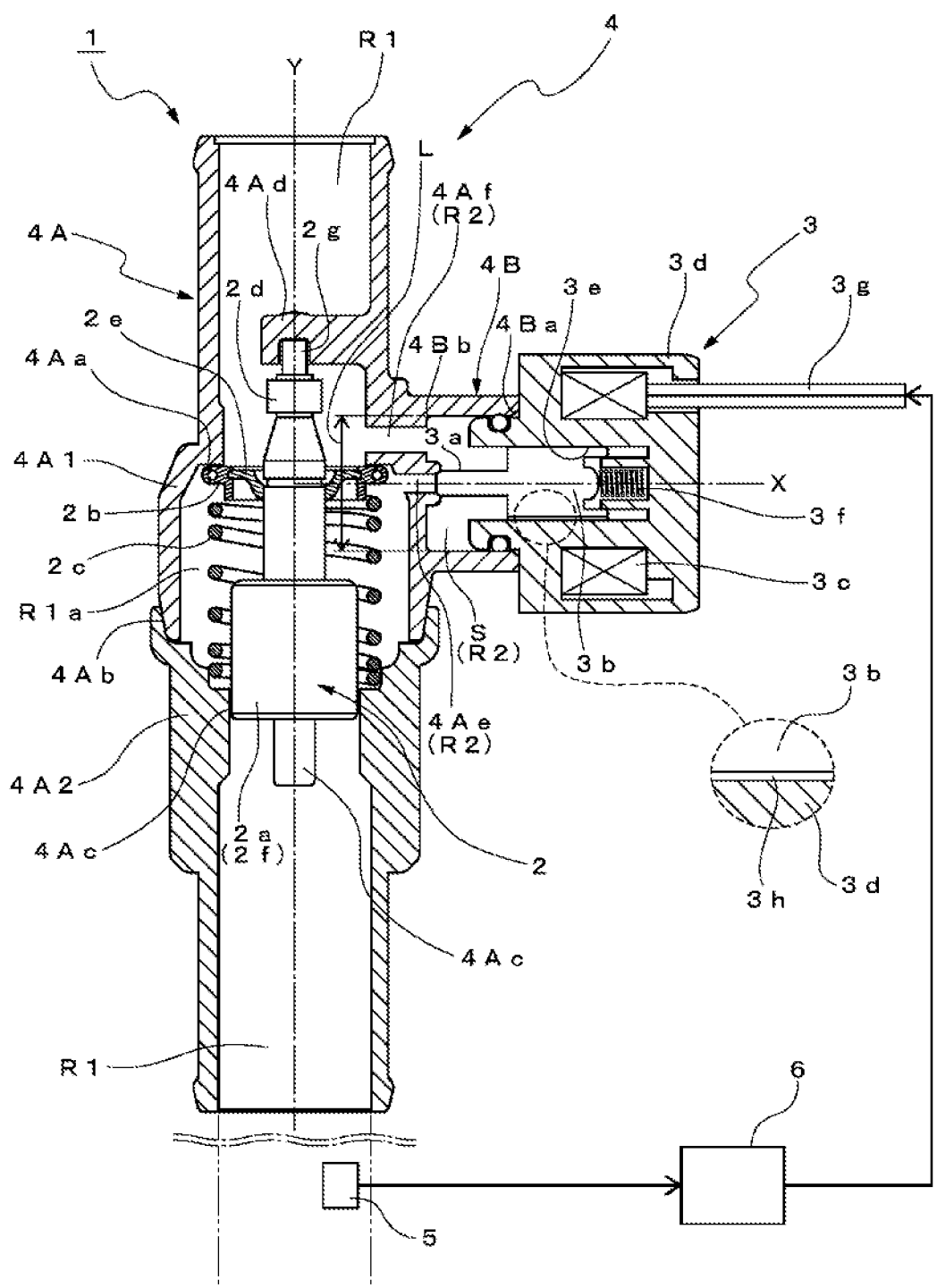
FIG. 1 is a conceptual diagram illustrating a cooling water temperature control device according to a first embodiment of the present invention.
Figure 2:
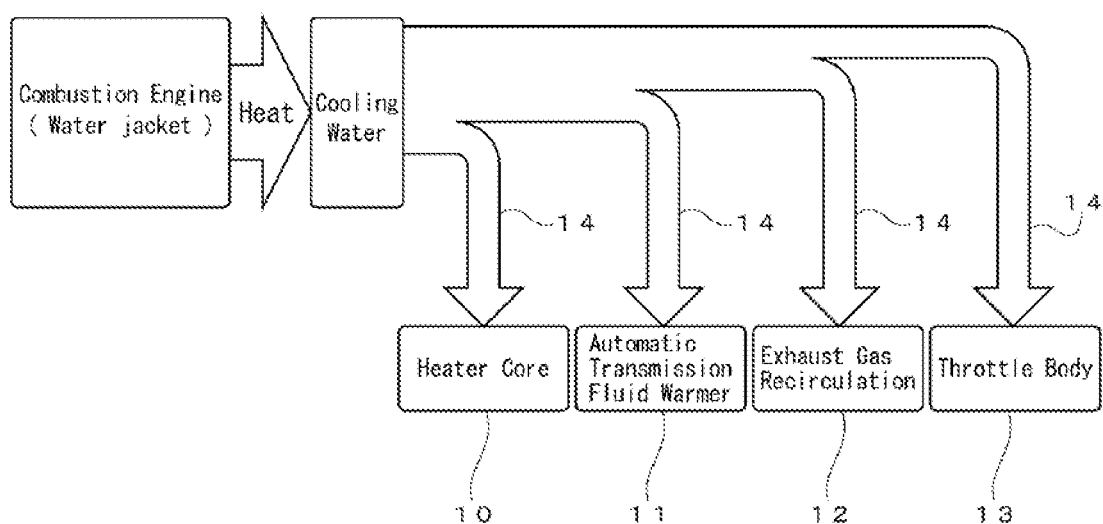
FIG. 2 is a conceptual diagram illustrating a cooling system including the cooling water temperature control device according to the first embodiment of the present invention.

A cooling water temperature control device according to a first embodiment of the present invention will be described below with reference to FIGS. 1 to 5. As illustrated in FIG. 1, the cooling water temperature control device includes a valve unit 1 having a thermo valve 2 and a sub-valve 3, a temperature sensor 5 that is disposed on the upstream side of the thermo valve 2 and detects the temperature of the cooling water, and a control unit 6 that opens the sub-valve 3 according to the temperature of the cooling water detected by the temperature sensor 5. Moreover, the cooling water temperature control device according to the present embodiment includes a plurality of valve units 1, and as illustrated in FIG. 2, for example, each valve unit 1 is disposed in the middle of a passage 14 connecting a water jacket of an internal combustion engine and each device such as a heater core 10, an automatic transmission fluid (ATF) warmer 11, an exhaust gas recirculation (EGR) 12, and a throttle body 13. Accordingly, the cooling water temperature control device can individually control a supply of the cooling water to each device. Note that the number of valve units 1 provided in the cooling water temperature control device may be one or more and can be appropriately changed according to the number of devices to which the supply of the cooling water is controlled. In addition, the type of device to which the supply of the cooling water is controlled can be appropriately changed. For example, the cooling water temperature control device according to the present invention may be used to control the supply of the cooling water to a radiator.

Valve Unit

As illustrated in FIG. 1, the valve unit 1 of the cooling water temperature control device according to the present embodiment includes a valve case 4 in which a main flow passage R1 is formed, the thermo valve 2 that is housed in the valve case 4 and opens and closes the main flow passage R1 depending on the temperature of the cooling water, and the sub-valve 3 that is attached to a side portion of the valve case 4 and opens and closes a sub-flow passage R2 bypassing the thermo valve 2.

In the present embodiment, the sub-valve 3 is a solenoid valve, includes a solenoid as an electromagnetic actuator, and opens and closes by an operation of the solenoid. Additionally, the electromagnetic actuator may be a motor. Further, when the sub-valve is the electromagnetic valve that opens and closes by the electromagnetic actuator, the sub-valve can be electrically controlled, but the sub-valve may be an open/close valve that is manually opened and closed.

The valve case 4 includes a valve case main body 4A and a sleeve 4B that is formed so as to protrude outward from the valve case main body 4A and in which a cooling water storage chamber S is formed. The valve case main body 4A is formed by joining a first cylindrical portion 4A1 and a second cylindrical portion 4A2 individually formed, and the sleeve 4B is integrally molded with the first cylindrical portion 4A1.

Each of the first cylindrical portion 4A1 and the second cylindrical portion 4A2 is a straight tubular member made of a synthetic resin, and a second end portion of the first cylindrical portion 4A1 and a first end portion of the second cylindrical portion 4A2 are joined by a laser welding (joined at a joint portion 4Ab), whereby the first cylindrical portion 4A1 and the second cylindrical portion 4A2 are integrated as the valve case main body 4A. Further, as described above, the first cylindrical portion 4A1 and the sleeve 4B are integrally molded, whereby the valve case main body 4A and the sleeve 4B are integrated as the valve case 4. Note that the material and the joining method of the first cylindrical portion 4A1 and the second cylindrical portion 4A2 are not limited to those described above. For example, the second end portion of the first cylindrical portion 4A1 and the first end portion of the second cylindrical portion 4A2 may be joined by screwing. Further, the valve case main body 4A and the sleeve 4B may be formed separately and then joined, and a method of forming the valve case 4 can be appropriately changed. A first end portion of the first cylindrical portion 4A1 and a second end portion of the second cylindrical portion 4A2, which are both ends of the valve case main body 4A, are connected to other pipelines constituting the passage 14 through which the cooling water circulates.

Further, the sleeve (branch pipe) 4B is formed so as to protrude outward from the side portion of the first cylindrical portion 4A1 (in a radial direction outward of the first cylindrical portion 4A1). That is, assuming that a straight line passing through centers of the first cylindrical portion 4A1 and the second cylindrical portion 4A2 (the valve case main body 4A) is an axis Y and a straight line passing through the center of the sleeve 4B is an axis X, the valve case main body 4A and the sleeve 4B are arranged such that the axes X and Y intersect. In this way, the pipelines constituting the passage 14 through which the cooling water circulates can be connected to both ends of the valve case main body 4A, and the connection is easy. The valve case main body 4A and the sleeve 4B may be arranged such that the axes X and Y obliquely intersect with each other in addition to being arranged such that the axes X and Y are orthogonal to each other as illustrated in FIG. 1.

Further, the first cylindrical portion 4A1 and the second cylindrical portion 4A2 do not necessarily have a straight shape, and may have, for example, an L shape or a U shape. Moreover, for example, when the first cylindrical portion 4A1 has the L shape, the sleeve 4B may be disposed on the extension of the second cylindrical portion 4A2 in an axial direction. As described above, the shape of the valve case main body 4A including the first cylindrical portion 4A1 and the second cylindrical portion 4A2 and the position of the sleeve 4B can be appropriately changed in accordance with the shape of the pipelines constituting the passage 14.

The main flow passage R1 through which the cooling water flows is formed inside the valve case main body 4A including the first cylindrical portion 4A1 and the second cylindrical portion 4A2. On an inner periphery of the first cylindrical portion 4A1, a piston receiving portion 4Ad that receives a piston 2g of the thermo valve 2 is formed to protrude from an inner wall of the first cylindrical portion 4A1, but the main flow passage R1 is not blocked by the piston receiving portion 4Ad. Further, an inner diameter of the first cylindrical portion 4A1 is larger on the first end side (the second cylindrical portion 4A2 side) than on the second end side, and a portion (a step) where the inner diameter changes is an annular valve seat 4Aa on which a valve body 2b of the thermo valve 2 is seated and unseated. Namely, the valve seat 4Aa is positioned in the middle of the main flow passage R1. Further, assuming that a direction along the axis Y passing through the center of the valve case main body 4A is the axial direction of the valve case main body 4A, the valve seat 4Aa is located in a region L facing an opening end portion 4Bb of the sleeve 4B on the valve case main body 4A side in the axial direction in the valve case main body 4A.

Ribs 4Ac are formed on the inner periphery of the second cylindrical portion 4A2 so as to protrude from the inner wall of the second cylindrical portion 4A2. The ribs 4Ac extend along the axial direction of the valve case main body 4A. Further, a plurality of ribs 4Ac are provided side by side in a circumferential direction of the second cylindrical portion 4A2 (the valve case main body 4A). A second end of a spring 2c whose first end is locked to the valve body 2b of the thermo valve 2 is supported at the end portion of the plurality of ribs 4Ac on an upper side in FIG. 1 (the first cylindrical portion 4A1 side). In other words, the ribs 4Ac function as spring bearings that support the second end of the spring 2c. In addition, a temperature sensing unit 2f, which will be described later, of the thermo valve 2 is inserted inside the plurality of ribs 4Ac arranged in the circumferential direction so as to be movable in the axial direction, and these ribs 4Ac prevent the temperature sensing unit 2f from being shifted in the radial direction (anti-shaking). In other words, the ribs 4Ac function not only as the spring bearings as described above, but also as a guide of the temperature sensing unit 2f. Further, because a gap is formed along the axial direction between the ribs 4Ac adjacent in the circumferential direction, even when the temperature sensing unit 2f is guided by the ribs 4Ac, the flow of the cooling water passing through the main flow passage R1 is not hindered by the ribs 4Ac. As will be described in detail later, the thermo valve 2 is opened when the temperature sensing unit 2f is warmed by the cooling water around the temperature sensing unit 2f. In other words, the temperature sensing unit 2f senses the temperature (the temperature sensing) around the temperature sensing unit 2f, and a portion surrounding the temperature sensing unit 2f and affecting the temperature sensing unit 2f in the main flow passage R1 is referred to as a sensed region R1a. More specifically, the sensed region R1a refers to a portion where the cooling water is in contact with the temperature sensing unit 2f and a peripheral portion thereof.

Further, the cooling water storage chamber S is formed inside the sleeve (branch pipe) 4B. Specifically, a casing 3d of the sub-valve 3 is attached to an opening end portion 4Ba of the sleeve (branch pipe) 4B on the side opposite to the valve case main body 4A (the opposite side to the valve case main body) via a seal member. As a result, the opening end portion 4Ba of the sleeve (branch pipe) 4B on the opposite side to the valve case main body is closed by the sub-valve 3, and the cooling water storage chamber S is formed in a portion surrounded by the sleeve 4B and the sub-valve 3. As described above, since the sub-valve 3 is attached to the opening end portion 4Ba of the sleeve 4B from the outside, the sub-valve 3 can be easily attached. Moreover, the opening end portion 4Ba of the sleeve 4B on an outside air side can be easily closed by attaching the sub-valve 3.

Further, the cooling water flows into the valve case 4 from a lower side (the first end) of the second cylindrical portion 4A2 in FIG. 1 and flows out of the valve case 4 from the upper side (the second end) of the first cylindrical portion 4A1 in FIG. 1, and a lead-out passage 4Ae that leads the cooling water in the main flow passage R1 (in the first cylindrical portion 4A1) to the cooling water storage chamber S is provided on the upstream side of the valve seat 4Aa in the flow direction of the cooling water. Further, on the downstream side of the valve seat 4Aa in a flow direction of the cooling water, a lead-in passage 4Af that leads the cooling water in the cooling water storage chamber S into the main flow passage R1 (the first cylindrical portion 4A1) is provided. Accordingly, even when the valve body 2b of the thermo valve 2 is seated on the valve seat 4Aa and the thermo valve 2 closes the main flow passage R1, the cooling water can pass through the lead-out passage 4Ae, the cooling water storage chamber S, and the lead-in passage 4Af and pass through the valve case 4. In other words, the cooling water storage chamber S, the lead-out passage 4Ae, and the lead-in passage 4Af form the sub-flow passage R2 bypassing the thermo valve 2.

Further, as described above, the valve seat 4Aa is located in the region L opposing the opening end portion of the sleeve 4B on the valve case main body 4A side in the axial direction of the valve case main body 4A. As described above, because an opening and closing portion of the thermo valve 2 and the cooling water storage chamber S are disposed close to each other when the valve seat 4Aa serving as the opening and closing portion opened or closed by the thermo valve 2 is disposed in the main flow passage R1, the length of the lead-out passage 4Ae that communicates the upstream side of the opening and closing portion with the cooling water storage chamber S and the length of the lead-in passage 4Af that communicates the downstream side of the opening and closing portion with the cooling water storage chamber S can be respectively shortened, and the valve case 4 can be downsized, leading to a downsize in the valve unit 1. In addition, one end on the upstream side of the sub-valve 3 in the sub-flow passage R2 is connected between the sensed region R1a where the thermo valve 2 senses the temperature of the cooling water in the main flow passage R1 and the valve seat 4Aa serving as the opening and closing portion of the thermo valve 2. Accordingly, the sub-flow passage R2 functions as a bypass passage bypassing the thermo valve 2, and when the sub-valve 3 opens the sub-flow passage R2, a flow of the cooling water is generated in the sensed region R1a even when the thermo valve 2 is closed, and the cooling water on the upstream side reaches the sensed region R1a.

Additionally, one end of the sub-flow passage R2 may be connected to a position where the flow of the cooling water is generated in the sensed region R1a in the case where the sub-valve 3 is opened even when the thermo valve 2 is closed, and may be connected to the sensed region R1a, for example. Further, in FIG. 1, the sub-valve 3 opens and closes a connection portion between the lead-out passage 4Ae and the cooling water storage chamber S in the sub-flow passage R2, but the sub-valve 3 may open and close the lead-in passage 4Af, or any part of the sub-flow passage R2 may be opened and closed by the sub-valve 3.

Thermo Valve

As the thermo valve 2, a commonly used thermo valve can be employed. For example, as illustrated in FIG. 1, the thermo valve 2 includes a thermo-sensitive element 2a as a temperature-sensitive actuator that changes its shape depending on the temperature of the cooling water to drive the valve body 2b, the valve body 2b that is driven by the thermo-sensitive element 2a to unseat from or seat on the valve seat 4Aa and open and close the main flow passage R1, and the spring 2c that biases the valve body 2b in a direction in which the valve is normally closed (a direction in which the valve body 2b is seated on the valve seat 4Aa). The thermo-sensitive element 2a includes a piston guide 2d, the piston 2g that moves forward and backward while being guided by the piston guide 2d and has a distal end engaged with the piston receiver 4Ad, and the temperature sensing unit 2f incorporating the wax as a thermal expansion body that expands or contracts due to the temperature change of the cooling water to move the piston 2g forward and backward.

The valve body 2b is attached to the piston guide 2d via a frame 2e, and a case of the temperature sensing unit 2f is attached to the piston guide 2d. Accordingly, the piston guide 2d, the valve body 2b, and the temperature sensing unit 2f integrally move in the axial direction with respect to the piston 2g. Further, as described above, one end of the spring 2c is supported by the valve body 2b, and the other end of the spring 2c is supported by an upper end surface of the ribs 4Ac of the second cylindrical portion 4A2. The spring 2c may be any spring, but is a coil spring in the present embodiment, and is interposed in a compressed state between the valve body 2b and the ribs (the spring bearings) 4Ac. Therefore, the valve body 2b is biased by the spring 2c in a direction in which the valve is normally closed (a direction in which the valve body 2b is seated on the valve seat 4Aa).

In the thermo valve 2 configured as described above, when the cooling water of the sensed region R1a located around the temperature sensing unit 2f rises to the predetermined temperature or higher, the temperature sensing unit 2f is warmed by the cooling water, and the wax in the temperature sensing unit 2f expands, the piston 2g is pushed out and the thermo-sensitive element 2a extends. At this time, because an upper end of the piston 2g is in contact with the piston receiving portion 4Ad, when the piston 2g is pushed out, the piston guide 2d, the temperature sensing unit 2f, and the valve body 2b move downward in FIG. 1 against a biasing force of the spring 2c. As a result, the valve body 2b is separated from the valve seat 4Aa to open the main flow passage R1, and the cooling water passes between the valve body 2b and the valve seat 4Aa.

In addition, when a heat dissipation of the cooling water is promoted, the cooling water of the sensed region R1a falls below the predetermined temperature and the temperature sensing unit 2f is cooled by the cooling water, and when the wax in the temperature sensing unit 2f contracts, the piston 2g enters and the thermo-sensitive element 2a contracts. At this time, because the upper end of the piston 2g is in contact with the piston receiving portion 4Ad and the valve body 2b is biased toward the valve seat 4Aa side by the spring 2c, when the piston 2g enters, the piston guide 2d, the temperature sensing unit 2f, and the valve body 2b move upward in FIG. 1 in accordance with the biasing force of the spring 2c. Accordingly, the valve body 2b is seated on the valve seat 4Aa to close the main flow passage R1.

When the minimum temperature required for the valve body 2b to unseat from the valve seat 4Aa (to open the main flow passage R1) due to a shape change (extension) of the thermo-sensitive element 2a is defined as the operating temperature of the thermo valve 3, the operating temperature is uniquely set in advance by an adjustment of the wax in the temperature sensing unit 2f or the like.

Sub-Valve

As the sub-valve 3, a commonly used solenoid valve can be employed. For example, the sub-valve 3 includes a plunger 3b as a mover in which a valve body portion 3a that opens and closes the lead-out passage 4Ae is formed at a tip end portion, and a coil 3c disposed so as to surround the plunger 3b, and the plunger 3b and the coil 3c constitute the electromagnetic actuator. A power supply line 3g that supplies a control current to the coil 3c in response to a command from the control unit 6 is connected to the sub-valve 3. Further, the coil 3c is housed in the casing 3d. The casing 3d is provided with a guide hole 3e into which the plunger 3b is slidably inserted.

A biasing spring 3f is disposed in a space between the plunger 3b and the bottom of the guide hole 3e. The plunger 3b (the valve body 3a) is biased by the biasing spring 3f in a direction of closing the lead-out passage 4Ae. Further, when the coil 3c is excited by energization, the plunger 3b (the valve body 3a) is attracted in a direction of opening the lead-out passage 4Ae against the biasing force of the biasing spring 3f. On the other hand, at the time of non-energization, the plunger 3b receives the biasing force of the biasing spring 3f to close the lead-out passage 4Ae. As described above, the sub-valve 3 of the present embodiment is a normally-closed solenoid valve.

Further, a groove is formed along the axial direction on the outer circumference of plunger 3b. These grooves form a communicating passage 3h between the plunger 3b and the casing 3d, which communicates both sides of the plunger 3b in the direction of its movement. When the plunger 3b reciprocates, the space formed between the plunger 3b and the bottom portion of the casing 3d expands or contracts, but because the communication passage prevents hindering plunger movement due to the confinement of cooling water in the space, the operation guarantee of plunger 3b is possible. Additionally, in FIG. 1, the communication passage 3h that communicates with both sides in the moving direction of the plunger 3b is formed by the groove formed in the outer periphery of the plunger 3b, but the method of forming the communication passage 3h is not limited thereto. For example, the communication passage 3h may be formed by the groove formed in a peripheral wall of the guide hole 3e into which the plunger 3b is inserted or a through hole penetrating the plunger 3b in the axial direction (the moving direction of the plunger 3b).

The valve body portion 3a at the distal end portion of the plunger 3b in thus constituted sub-valve 3 closes the lead-out passage 4Ae at the time of non-energization, and opens the lead-out passage 4Ae when receiving the supply of the control current from the control unit 6. Accordingly, even when the thermo valve 2 closes the main flow passage R1, the cooling water passes through the sub-flow passage R2 and flows from the inside to the outside of the valve case 4.

Control Unit

The control unit 6 is configured to control a supply current to the sub-valve 3 on the basis of the temperature information on the upstream side of the thermo valve 2 detected by the temperature sensor 5, thereby controlling the opening and closing of the sub-valve 3. Specifically, the control unit 6 sends a command to open the sub-valve 3 when determining that the temperature of the cooling water on the upstream side of the thermo valve 2 has reached the predetermined temperature set in advance. Further, when the predetermined temperature at which the sub-valve 3 is opened is X (° C.) and the operating temperature of the thermo valve 2 set in advance by adjusting the wax incorporated in the temperature sensing unit is F1 (° C.), an operating temperature F1 is set to be equal to or lower than a predetermined temperature X at which the sub-valve 3 is opened (F1≤X). In addition, the control unit 6 may perform the opening and closing control of the sub-valve 3 only by the temperature information obtained from the temperature sensor 5, or may perform the opening and closing control of the sub-valve 3 using the temperature information obtained from the temperature sensor 5 and, for example, opening degree information of the throttle valve or rotational speed information of the internal combustion engine. Further, after the thermo valve 2 is opened, the control unit 6 sends a command to close the sub-valve 3. As for the determination of whether the thermo valve 2 is opened or not, the thermo valve 2 may be determined to have opened when a predetermined time has elapsed after sub-valve 3 is opened or may be determined based on the information from the flow rate sensor disposed on the downstream of the thermo valve 2 in the main flow passage R1.

Assembly of Valve Unit

An example of a method for assembling the valve unit 1 according to the present embodiment will be described below. First, the thermo valve 2 is housed in the first cylindrical portion 4A1. Specifically, the thermo valve 2 is housed from the first end portion of the first cylindrical portion 4A1 which is separated from the second cylindrical portion 4A2. At this time, the piston 2g is engaged with the piston receiving portion 4Ad, and the valve body 2b is in contact with the valve seat 4Aa. Further, the spring 2c is housed so as to be in contact with a back surface of the valve body 2b, and then the second cylindrical portion 4A2 is fitted to the first cylindrical portion 4A1, and both are joined by the laser welding. Accordingly, the housing of the thermo valve 2 into the valve case 4 is completed.

Subsequently, the sub-valve 3 is attached to the sleeve 4B of the valve case 4. Specifically, the casing 3*d* of the sub-valve 3 is attached to the opening end portion 4Ba from the outside of the sleeve (branch pipe) 4B via the seal member. Additionally, although not illustrated, the casing 3*d* of the sub-valve 3 is provided with a flange, and the flange is fixed by bolting (screwing) the flange to the sleeve 4B.

As described above, in the valve unit 1, the thermo valve 2 is disposed in the valve case main body 4A including the first cylindrical portion 4A1, and the sub-valve 3 is attached to the sleeve 4B protruding outward from the valve case main body 4A. Therefore, the valve unit can be downsized. Further, according to the method for assembling the valve unit 1 described above, the valve unit 1 can be easily assembled because the thermo valve 2 is easily assembled in the valve case 4 and the sub-valve 3 is easily assembled to the sleeve 4B from the outside of the sleeve 4B.

Action of Cooling Water Temperature Control Device

According to the cooling water temperature control device concerning the present embodiment, in a case where it is desired to open the thermo valve 2 of the valve unit 1 provided in each of the passages 14 connected to the water jacket of the internal combustion engine and passing through each device such as the heater core 10, the automatic transmission fluid (ATF) warmer 11, the exhaust gas recirculation (EGR) 12, or the throttle body 13 at different temperatures, when the operating temperatures of all the thermo valves 2 are set to a temperature equal to or lower than the minimum temperature (the lower limit) of the temperature range (hereinafter, referred to as the predetermined temperature range) for valve opening, it is possible to open each thermo valve 2 at a predetermined temperature within the predetermined temperature range while using the common thermo valve 2, that is, the thermo valve 2 set to the common operating temperature. Specifically, for example, when the temperature of the cooling water desired to be supplied to a first device is 60° C. or higher, the temperature of the cooling water desired to be supplied to a second device is 70° C. or higher, and the temperature of the cooling water desired to be supplied to a third device is 80° C. or higher, the predetermined temperature range in which the thermo valves 2 are desired to be opened is a range of 60° C. to 80° C., and the operating temperature of the thermo valves 2 is set to 60° C. or lower, which is the minimum temperature of the predetermined temperature range, for example, 50° C. or the like.

Initially, the temperature of the cooling water in the entire cooling system illustrated in FIG. 2 is low and is equal to or lower than the operating temperature of the thermo valves 2 (for example, 50° C.), and the thermo valves 2 of all the valve units 1 are closed as illustrated in FIG. 1. Further, in this case, the control unit 6 determines that the temperature of the cooling water on the upstream side of the thermo valve 2 has not reached any predetermined temperature of the cooling water desired to be supplied to each device (for example, 60° C., 70° C., or 80° C.), cuts off the supply of the control current to the sub-valve 3, and closes the sub-valve 3. As described above, in a state where both the thermo valve 2 and the sub-valve 3 are closed, the cooling water in the valve case 4 (the sensed region R1*a*) is retained without flowing.

Further, in a state where the thermo valve 2 and the sub-valve 3 are closed and the cooling water in the valve case 4 is retained, even when the temperature of the cooling water on the upstream side (the internal combustion engine side) of the thermo valve 2 rises to the operating temperature (for example, 50° C.) or higher, the cooling water whose temperature has risen does not reach the sensed region R1*a*. As a result, because the temperature of the sensed region R1*a* does not rise, the wax incorporated in the temperature sensing unit 2*f* is not warmed. In other words, in a state where both the thermo valve 2 and the sub-valve 3 are closed and the cooling water in the sensed region R1*a* is retained, even when the temperature on the upstream side of the thermo valve 2 reaches the operating temperature, the thermo valve 2 cannot sense the temperature on the upstream side, and a valve opening operation of the thermo valve 2 is not performed.

Figure 3:
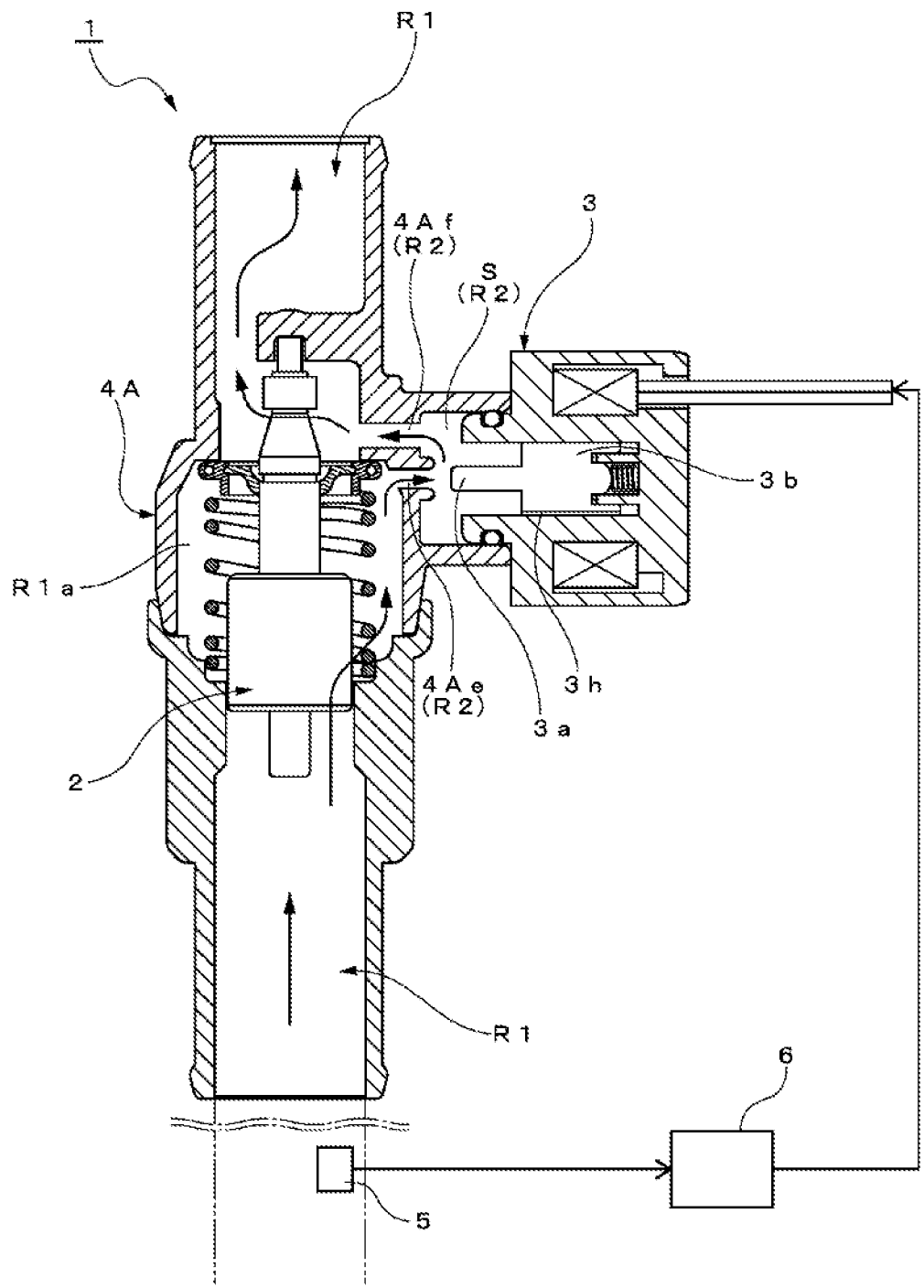
FIG. 3 illustrates a state in which a sub-valve of the cooling water temperature control device illustrated in FIG. 1 is opened and a thermo valve is closed.

On the other hand, when the control unit 6 determines that the temperature of the cooling water on the upstream side of the thermo valve 2 has reached, for example, the predetermined temperature of the cooling water to be supplied to the first device (for example, 60° C.), the control current is supplied to the sub-valve 3 of the valve unit 1 provided in the passage 14 leading to the first device to open the sub-valve 3. Specifically, as illustrated in FIG. 3, when the coil 3*c* is excited by receiving the supply of the control current from the control unit 6, the plunger 3*b* is pulled rightward in FIG. 3, and the valve body portion 3*a* of the plunger 3*b* opens the lead-out passage 4Ae. Subsequently, as indicated by solid arrows, the cooling water flows through the sub-flow passage R2 even when the thermo valve 2 closes the main flow passage R1. In other words, the cooling water is led into the cooling water storage chamber S through the lead-out passage 4Ae, and is returned from the cooling water storage chamber S into the first cylindrical portion 4A1 through the lead-in passage 4Af.

Figure 4:
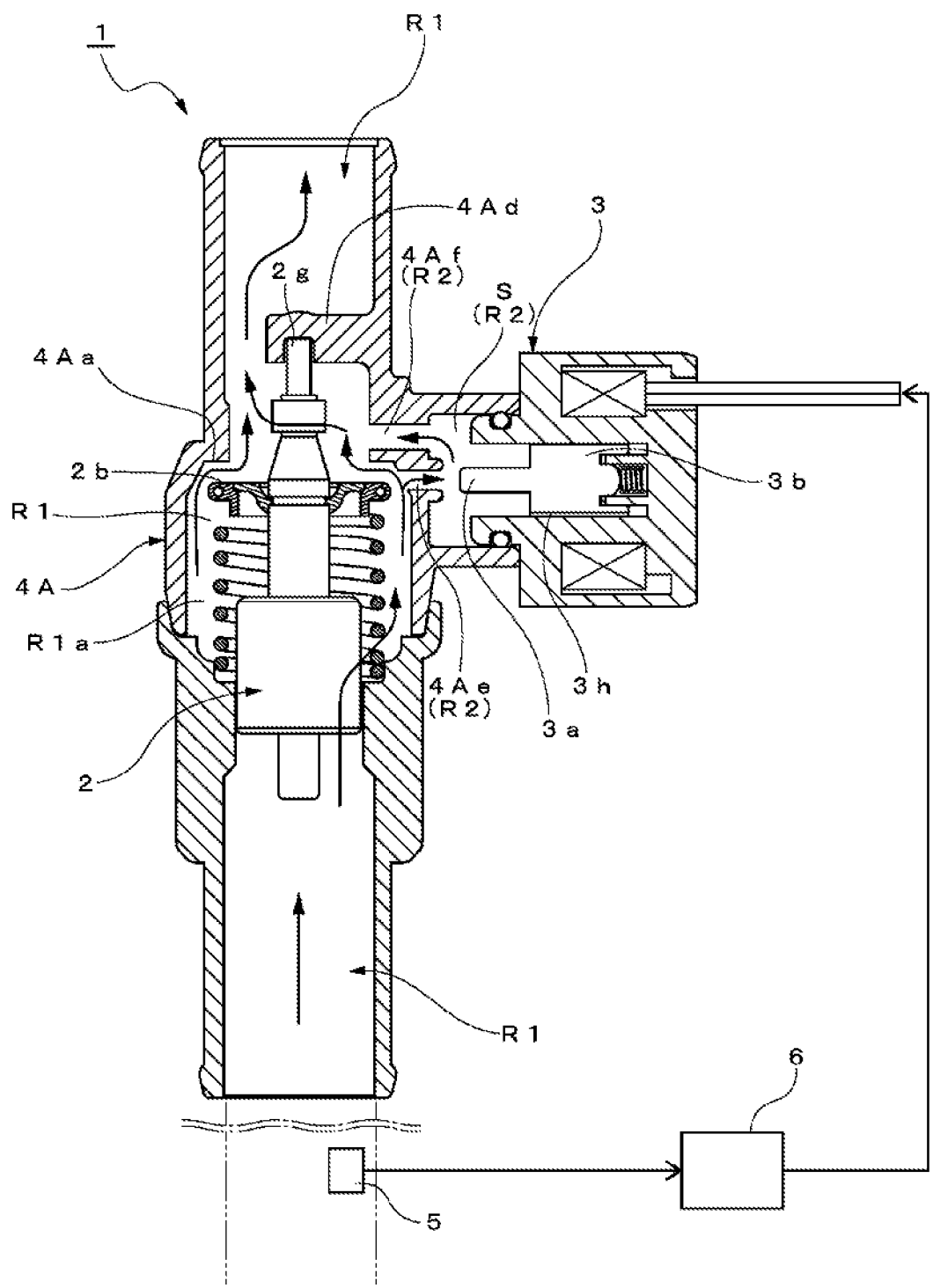
FIG. 4 illustrates a state in which the sub-valve and the thermo valve of the cooling water temperature control device illustrated in FIG. 1 are opened.

As described above, when the sub-valve 3 opens the sub-flow passage R2, the flow of the cooling water is generated in the valve case 4 (the sensed region R1*a*), and the cooling water with the increased temperature reaches the temperature sensing unit 2*f*. In addition, because the operating temperature of the thermo valve 2 (for example, 50° C.) is set to be equal to or lower than the predetermined temperature of the cooling water to be supplied to the first device (for example, 60° C.), the thermo valve 2 is quickly opened, and the cooling water flows through the main flow passage R1 as illustrated in FIG. 4.

When the control unit 6 determines that the temperature of the cooling water on the upstream side of the thermo valve 2 has reached the predetermined temperature of the cooling water to be supplied to the second device (for example, 70° C.), the control current is supplied to the sub-valve 3 of the valve unit 1 provided in the passage 14 leading to the second device to open the sub-valve 3. Similarly, when the control unit 6 determines that the temperature of the cooling water on the upstream side of the thermo valve 2 has reached the predetermined temperature of the cooling water to be supplied to the third device (for example, 80° C.), the control current is supplied to the sub-valve 3 of the valve unit 1 provided in the passage 14 leading to the third device to open the sub-valve 3. Subsequently, as described above, when the sub-valve 3 is opened, the flow of the cooling water is generated in the sensed region R1*a*, and the thermo valve 2 can sense the temperature (the temperature sensing). Further, because each predetermined temperature is equal to or higher than the operating temperature of the thermo valve 2, the thermo valve 2 is immediately opened. In other words, it can be said that the predetermined temperature at which the sub-valve 3 is opened is a predetermined valve opening temperature at which the thermo valve 2 is opened.

As described above, when the predetermined valve opening temperature that opens the thermo valve 2 is equal to or higher than the operating temperature of the thermo valve 2, the valve opening operation of the thermo valve 2 can be controlled by the opening and closing control of the sub-valve 3 without adjusting the operating temperature of the thermo valve 2 itself by adjusting the wax. In other words, according to the cooling water temperature control device of the present embodiment, even when the operating temperature of the thermo valve 2 is constant, the valve opening temperature of the thermo valve 2 can be freely set at any predetermined temperature equal to or higher than the operating temperature. Accordingly, even when different temperatures are desired for opening the passages 14 leading to the devices such as the heater core 10, the automatic transmission fluid (ATF) warmer 11, the exhaust gas recirculation (EGR) 12, and the throttle body 13, it is not necessary to individually prepare the thermo valves 2 having different operating temperatures. Further, by using the valve unit 1, the temperature at which each passage 14 is opened can be easily changed, so that the entire cooling system can be easily tuned.

Moreover, as described above, in order for the thermo valve 2 to sense the temperature, the cooling water needs to flow in the valve case 4 (the sensed region R1a). For this reason, when the thermo valve 2 alone is provided in the passage 14 as in the conventional case, it is necessary to slightly flow the cooling water for the temperature sensing even when the thermo valve 2 is in a closed state. However, according to the cooling water temperature control device of the present embodiment, it is sufficient to open the sub-valve 3 when it is desired to cause the thermo valve 2 to sense the temperature; thus, it is possible to reduce the waste of cooling water and to efficiently use the heat of the cooling water.

Figure 5:
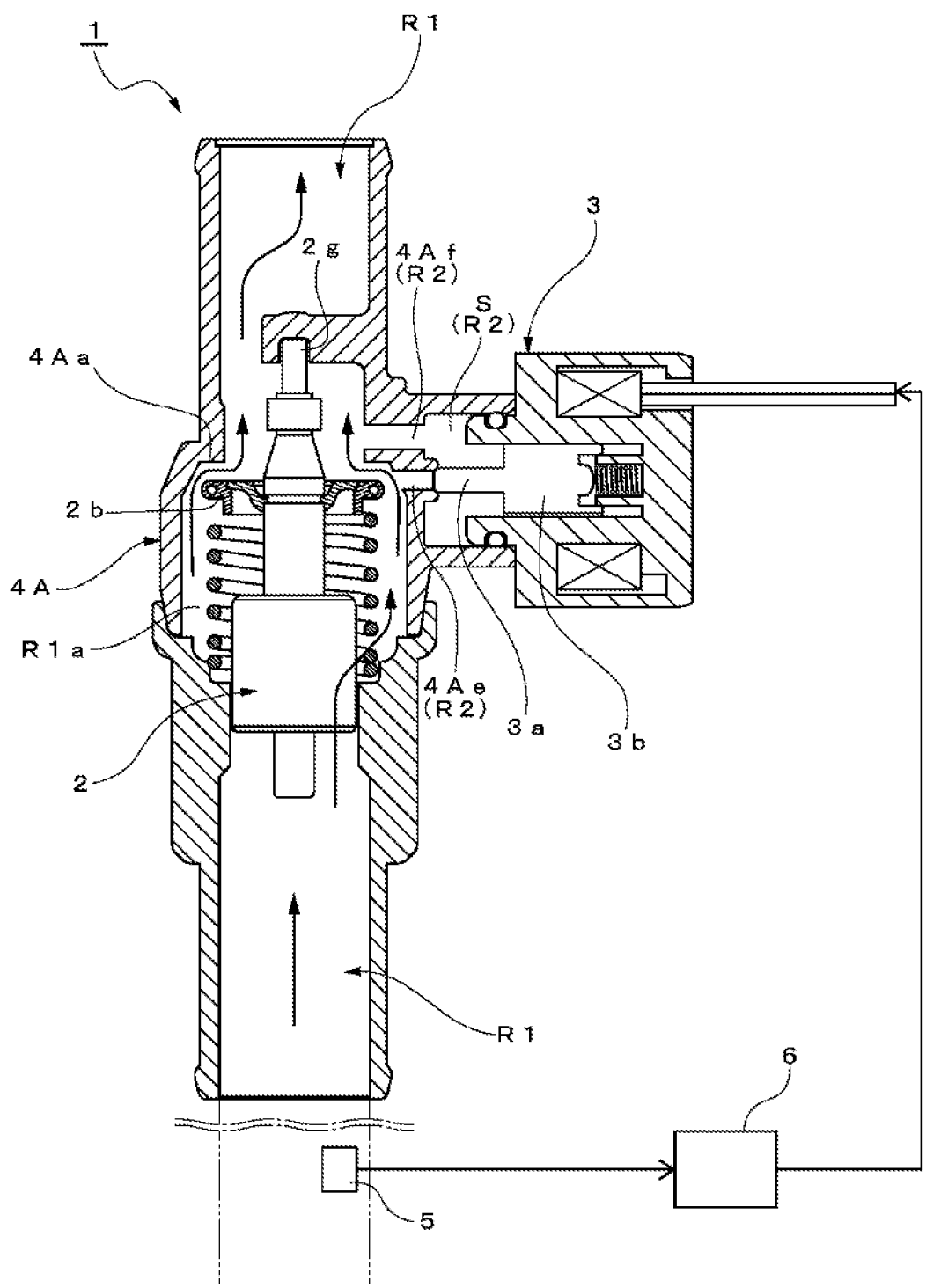
FIG. 5 illustrates a state in which the sub-valve of the cooling water temperature control device illustrated in FIG. 1 is closed and the thermo valve is opened.

Further, because the thermo valve 2 can sense the temperature when the flow of the cooling water is generated in the valve case 4 (the sensed region R1a), when the flow rate of the cooling water passing through the thermo valve 2 is sufficiently secured, the energization to the sub-valve 3 may be cut off to close the lead-out passage 4Ae as illustrated in FIG. 5 in response to the opening of the thermo valve 2. In this way, power can be saved, and the heat generation of the solenoid can be suppressed. In addition, because the flow rate of the cooling water passing through the sub-valve 3 only needs to be sufficient to cause the thermo valve 2 to sense the temperature and is very small as compared with the flow rate of the cooling water passing through the thermo valve 2, the sub-valve 3 can be downsized, which leads to the further downsizing of the valve unit 1. Moreover, regardless of whether the sub-valve 3 is opened or closed, when the temperature of the cooling water in the valve case 4 becomes lower than the operating temperature (for example, 50° C.), the thermo valve 2 is closed and returns to the state illustrated in FIG. 1.

In summary, because the operating temperature of the thermo valve 2 is uniquely determined by adjusting the wax as described above, it is necessary to adjust the wax in order to change the operating temperature. Accordingly, when the thermo valve 2 is used alone, it is necessary to prepare the thermo valve in which the wax is adjusted for each predetermined valve opening temperature such that the operating temperature becomes the predetermined valve opening temperature. However, the cooling water temperature control device of the present embodiment uses the thermo valve 2 and the sub-valve 3 in combination, and if the temperature of the cooling water on the upstream side of the thermo valve 2 is equal to or higher than the operating temperature of the thermo valve 2, the thermo valve 2 can be opened at the timing of the valve opening operation of the sub-valve 3. Therefore, even in the case where the thermo valve 2 having the same operating temperature is used, when the temperature at which the sub-valve 3 is opened is changed, the thermo valve 2 can be opened at any different predetermined temperature as long as the temperature is equal to or higher than the operating temperature of the thermo valve 2. In other words, the valve opening temperature of the thermo valve 2 can be set to any predetermined temperature equal to or higher than the operating temperature of the thermo valve 2. In addition, by providing a temperature difference between the operating temperature and the valve opening temperature of the thermo valve 2, the responsiveness of the valve opening of the thermo valve 2 can be enhanced. On the other hand, when the temperature of the cooling water is lower than the operating temperature of the thermo valve 2, the thermo valve 2 is closed. Accordingly, in the cooling water temperature control device, although the thermo valve 2 is used, the opening and closing are carried out at different temperatures.

Second Embodiment

In the first embodiment, the cooling water temperature control device including the thermo valve 2 that opens the main flow passage R1 when the temperature of the cooling water rises has been described as an example. However, the thermo valve may be a thermo valve that closes the main flow passage when the temperature of the cooling water rises. Hereinafter, a cooling water temperature control device including a thermo valve that closes the main flow passage in response to the increased temperature in the cooling water will be described as a second embodiment.

Because the difference between the second embodiment and the first embodiment is mainly whether the thermo valve is opened or closed at the operating temperature or higher, the difference will be described here, and the same or corresponding members will be denoted by the same reference numerals and detailed description thereof will be omitted. Further, in the following description, in order to distinguish the thermo valve 2 of the first embodiment from the thermo valve of the second embodiment, the thermo valve of the second embodiment is referred to as a thermo valve 20. Because the configuration of the thermo valve 20 is known, the illustration thereof is omitted.

In the thermo valve 20, when the cooling water of the sensed region R1a rises to a predetermined temperature or more, the temperature sensing unit is warmed by the cooling water, and the wax in the temperature sensing unit expands, the thermo-sensitive element extends, and the valve body is seated on the valve seat to close the main flow passage R1. On the other hand, when the temperature of the cooling water of the sensed region is lower than the predetermined temperature, the temperature sensing unit is cooled by the cooling water, and the wax in the temperature sensing unit contracts, the thermo-sensitive element contracts, and the valve body unseat from the valve seat 4Aa to open the main flow passage R1. Moreover, the valve body of the thermo valve 20 is biased by the spring in a direction in which the valve is normally opened (the direction in which the valve body is unseated from the valve seat 4Aa). When the minimum temperature required for the valve body to be seated on the valve seat 4Aa (to close the main flow passage R1) due to the shape change (extension) of the thermo-sensitive element in the thermo valve 20 is defined as the operating temperature of the thermo valve 20, the operating temperature is uniquely determined in advance by the adjustment of the wax in the temperature sensing unit or the like.

In addition, the control unit 6 is configured to control the supply current to the sub-valve 3 on the basis of the temperature information on the upstream side of the thermo valve 20 detected by the temperature sensor 5, thereby controlling the opening and closing of the sub-valve 3. Specifically, the control unit 6 sends the command to open the sub-valve 3 when determining that the temperature of the cooling water on the upstream side of the thermo valve 20 is lower than the predetermined temperature set in advance. Further, when the predetermined temperature at which the sub-valve 3 is opened is X (° C.), and the operating temperature of the thermo valve 20 set in advance by adjusting the wax incorporated in the temperature sensing unit of the thermo valve 20 is F2 (° C.), an operating temperature F2 is set to be higher than the predetermined temperature X at which the sub-valve 3 is opened. Also in the present embodiment, the control unit 6 may perform the opening and closing control of the sub-valve 3 only by the temperature information obtained from the temperature sensor 5, or may perform the opening and closing control of the sub-valve 3 using the temperature information obtained from the temperature sensor 5 and other information. Further, after the thermo valve 20 is opened, the control unit 6 issues the command to close the sub-valve 3.

Action of Cooling Water Temperature Control Device

According to the cooling water temperature control device according to the present embodiment, in the case where the thermo valve 20 of the valve unit 1 provided in the passage 14 that is connected to the water jacket of the internal combustion engine and passes through the device is desired to be opened at the predetermined temperature, if the operating temperature of the thermo valve 20 is set to a temperature higher than the predetermined temperature for valve opening, the thermo valve 20 can be opened at the predetermined temperature without replacing the thermo valve 20 with the thermo valve having a different operating temperature. Specifically, for example, in the case where it is desired to supply the cooling water to the device when the temperature of the cooling water to be supplied to the device becomes 60° C. or lower, the operating temperature of the thermo valve 20 is set to be higher than 60° C., for example, 70° C. or the like.

Subsequently, because the temperature of the cooling water of the entire cooling system is initially low, is equal to or lower than the temperature of the cooling water desired to be supplied to the device (for example, 60° C.), and is lower than the operating temperature of the thermo valve 20 (for example, 70° C.), the thermo valve 20 is opened. Accordingly, in a state where the thermo valve 20 is opened, the cooling water flows through the valve case 4 (the sensed region R1a), and the thermo valve 20 can sense the temperature of the cooling water. Further, in this case, the control unit 6 determines that the temperature of the cooling water on the upstream side of the thermo valve 20 is equal to or lower than the predetermined temperature of the cooling water to be supplied to the device, but the supply of the control current to the sub-valve 3 is cut off and the sub-valve 3 is closed because the thermo valve 20 is open.

Subsequently, when the temperature of the cooling water in the entire cooling system rises and the temperature on the upstream side of the thermo valve 20 reaches the operating temperature of the thermo valve 20 (for example, 70° C.), the thermo valve 20 closes the main flow passage R1. Further, under such circumstances, the control unit 6 determines that the temperature on the upstream side of the thermo valve 20 is not equal to or lower than the predetermined temperature of the cooling water to be supplied to the device (for example, 60° C.), and closes the sub-valve 3. As described above, in a state where both the thermo valve 20 and the sub-valve 3 are closed, the cooling water in the valve case 4 (the sensed region R1a) does not flow and is retained.

Further, in a state where the thermo valve 20 and the sub-valve 3 are closed and the cooling water in the valve case 4 is retained, even when the temperature of the cooling water on the upstream side of the thermo valve 20 decreases to be lower than the operating temperature (for example, 70° C.), the cooling water with the decreased temperature does not reach the sensed region R1a. As a result, because the temperature of the sensed region R1a does not decrease, the wax incorporated in the temperature sensing unit is not cooled. That is, in a state where both the thermo valve 20 and the sub-valve 3 are closed and the cooling water of the sensed region R1a is retained, even when the temperature on the upstream side of the thermo valve 20 becomes lower than the operating temperature, the thermo valve 20 cannot sense the temperature on the upstream side and the valve opening operation of the thermo valve 20 is not performed.

On the other hand, when the control unit 6 determines that the temperature of the cooling water on the upstream side of the thermo valve 20 has decreased to, for example, the predetermined temperature of the cooling water to be supplied to the device (for example, 60° C.), the control current is supplied to the sub-valve 3 to open the sub-valve 3. Subsequently, the flow of the cooling water is generated in the valve case 4 (the sensed region R1a), and the cooling water with the decreased temperature reaches the sensed region R1a. Because the thermo valve 20 is closed at the operating temperature (for example, 70° C.) or higher and is opened when the temperature is lower than the operating temperature, the thermo valve 20 is opened and the cooling water flows through the main flow passage R1.

As described above, according to the cooling water temperature control device of the present embodiment, when the thermo valve 20 and the sub-valve 3 are used in combination, under circumstances where the temperature upstream of the thermo valve 20 decreases from a temperature higher than the operating temperature of the thermo valve 20, the temperature at which the thermo valve 20 is opened can be easily adjusted by changing the temperature of the cooling water that opens the sub-valve 3.

REFERENCE SIGNS LIST

1 Cooling water temperature control device
2 Thermo valve
2a Thermo-sensitive element
2b Valve body
2c Spring
2d Piston guide
2e Frame
2f Temperature sensing unit
2g Piston
3 Sub-valve 3a Valve body portion
3b Plunger
3c Coil
3d Casing
3f Biasing spring
3h Communication passage
4 Valve case
4A Valve case main body
4A1 First cylindrical portion
4A2 Second cylindrical portion
4Aa Valve seat
4Ac Rib (spring seat)
4Ae Lead-out passage
4Ad Piston receiving portion
4Af Lead-in passage
4B Sleeve (branch pipe)
4Ba Opening end portion on the opposite side to the valve case main body (side opposite to the valve case main body)
4Bb Opening end portion on the valve case main body side
5 Temperature sensor
6 Control unit
R1 Main flow passage
R1a Sensed region
R2 Sub-flow passage
S Cooling water storage chamber

The invention claimed is:

1. A cooling water temperature control device comprising:
a main flow passage through which cooling water flows;
a thermo valve that is disposed in the main flow passage and opens and closes the main flow passage;
a sub-flow passage bypassing the thermo valve;
a sub-valve that opens and closes the sub-flow passage; and
a control unit that opens the sub-valve when a temperature of the cooling water on an upstream side of the thermo valve reaches a predetermined temperature, wherein
the thermo valve includes a temperature sensing unit that senses the temperature of a sensed region in the main flow passage, and opens the main flow passage when the temperature of the cooling water of the sensed region is equal to or higher than an operating temperature set in advance,
one end on the upstream side of the sub-flow passage is connected to the sensed region or a downstream side of the sensed region in the main flow passage, and
the operating temperature is set to be equal to or lower than the predetermined temperature,
wherein the cooling water temperature control device includes a valve case covering the thermo valve along an axis of the thermo valve such that the main flow passage is defined between the thermo valve and the valve case, and is extended along the axis of the thermo valve to a valve seat of the thermo valve,
the valve case covers the temperature sensing unit along the axis of the thermo valve,
the one end on the upstream side of the sub-flow passage is connected to an opening disposed to the valve case such that cooling water flows inside the main flow passage along a surface of the temperature sensing unit and then flows into the one end on the upstream side of the sub-flow passage through the opening when the sub-flow passage is opened.

2. The cooling water temperature control device according to claim 1, further comprising a plurality of valve units each having the thermo valve and the sub-valve, wherein
the predetermined temperature is set for each of the valve units, and
the operating temperature of the thermo valves in all the valve units is set to be equal to or lower than the minimum temperature among the predetermined temperatures.

3. The cooling water temperature control device according to claim 1, wherein the control unit closes the sub-valve provided in the sub-flow passage bypassing the thermo valve when the thermo valve is opened.

4. The cooling water temperature control device according to claim 1, wherein the sub-valve is an electromagnetic valve.

5. A cooling water temperature control device comprising:
a main flow passage through which cooling water flows;
a thermo valve that is disposed in the main flow passage and opens and closes the main flow passage;
a sub-flow passage bypassing the thermo valve;
a sub-valve that opens and closes the sub-flow passage; and
a control unit configured to open the sub-valve when a temperature of the cooling water on an upstream side of the thermo valve falls below a predetermined temperature, wherein the thermo valve includes a temperature sensing unit that senses the temperature of a sensed region in the main flow passage, and closes the main flow passage when the temperature of the cooling water of the sensed region is equal to or higher than an operating temperature set in advance,
one end on the upstream side of the sub-flow passage is connected to the sensed region or a downstream side of the sensed region in the main flow passage, and
the operating temperature is set to be higher than the predetermined temperature,
wherein the cooling water temperature control device includes a valve case covering the thermo valve along an axis of the thermo valve such that the main flow passage is defined between the thermo valve and the valve case, and is extended along the axis of the thermo valve to a valve seat of the thermo valve,
the valve case covers the temperature sensing unit along the axis of the thermo valve,
the one end on the upstream side of the sub-flow passage is connected to an opening disposed to the valve case such that cooling water flows inside the main flow passage along a surface of the temperature sensing unit and then flows into the one end on the upstream side of the sub-flow passage through the opening when the sub-flow passage is opened.

6. The cooling water temperature control device according to claim 5, wherein the control unit closes the sub-valve provided in the sub-flow passage bypassing the thermo valve when the thermo valve is opened.

7. The cooling water temperature control device according to claim 5, wherein the sub-valve is an electromagnetic valve.

* * * * *